(12) United States Patent
Chen et al.

(10) Patent No.: US 11,550,416 B2
(45) Date of Patent: Jan. 10, 2023

(54) TOUCH DISPLAY DEVICE AND OPERATION METHOD THEREOF

(71) Applicant: Novatek Microelectronics Corp., Hsinchu (TW)

(72) Inventors: Yu-Huang Chen, Tainan (TW); Feng-Lin Chan, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/399,058

(22) Filed: Aug. 11, 2021

(65) Prior Publication Data

US 2022/0050544 A1  Feb. 17, 2022

Related U.S. Application Data

(60) Provisional application No. 63/063,969, filed on Aug. 11, 2020.

(51) Int. Cl.
*G06F 3/041* (2006.01)
*G09G 3/3275* (2016.01)

(52) U.S. Cl.
CPC .......... *G06F 3/0412* (2013.01); *G06F 3/0416* (2013.01); *G09G 3/3275* (2013.01); *G09G 2330/021* (2013.01)

(58) Field of Classification Search
CPC .... G06F 3/0412; G06F 3/0416; G09G 3/3275
USPC ......................................................... 345/173
See application file for complete search history.

(56) References Cited

U.S. PATENT DOCUMENTS

| 8,599,167 | B2 | 12/2013 | Joharapurkar et al. |
| 8,830,207 | B1 | 9/2014 | Joharapurkar et al. |
| 2011/0261005 | A1 | 10/2011 | Joharapurkar et al. |
| 2013/0271420 | A1* | 10/2013 | Chen ..................... G06F 3/0446 345/174 |
| 2014/0327646 | A1 | 11/2014 | Yeh et al. |
| 2015/0091864 | A1* | 4/2015 | Reynolds ............ G06F 3/04184 345/174 |

(Continued)

FOREIGN PATENT DOCUMENTS

| TW | 201443718 | 11/2014 |
| TW | 201629739 | 8/2016 |

OTHER PUBLICATIONS

"Office Action of Taiwan Counterpart Application", dated Apr. 28, 2022, p. 1-p. 4.

*Primary Examiner* — Calvin C Ma
(74) *Attorney, Agent, or Firm* — JCIPRNET (57) ABSTRACT

A touch display device and an operation method thereof are provided. The touch display device includes a touch display panel, a power management circuit, a display driving circuit, and a touch circuit. The display driving circuit drives the touch display panel to display an image, and notifies the power management circuit to perform a voltage adjustment of a common voltage supplied to the touch display panel in a voltage adjustment period. The touch circuit individually performs a touch sensing operation on multiple sensing lines of a touch sensing layer of the touch display panel, so as to generate multiple touch sensing data corresponding to the sensing lines. The touch circuit ignores the touch sensing data corresponding to the voltage adjustment period, or the touch circuit suspends performing the touch sensing operation on the sensing lines of the touch sensing layer during the voltage adjustment period.

12 Claims, 4 Drawing Sheets

(56) References Cited

U.S. PATENT DOCUMENTS

2017/0090624 A1\* 3/2017 Kwon .................. G06F 1/3262

\* cited by examiner

TOUCH DISPLAY DEVICE AND OPERATION METHOD THEREOF

CROSS-REFERENCE TO RELATED APPLICATION

This application claims the priority benefit of U.S. provisional application Ser. No. 63/063,969, filed on Aug. 11, 2020. The entirety of the above-mentioned patent application is hereby incorporated by reference herein and made a part of this specification.

BACKGROUND

Technical Field

This disclosure relates to a display device, and in particular to a touch display device and an operation method thereof.

Description of Related Art

Figure 1:
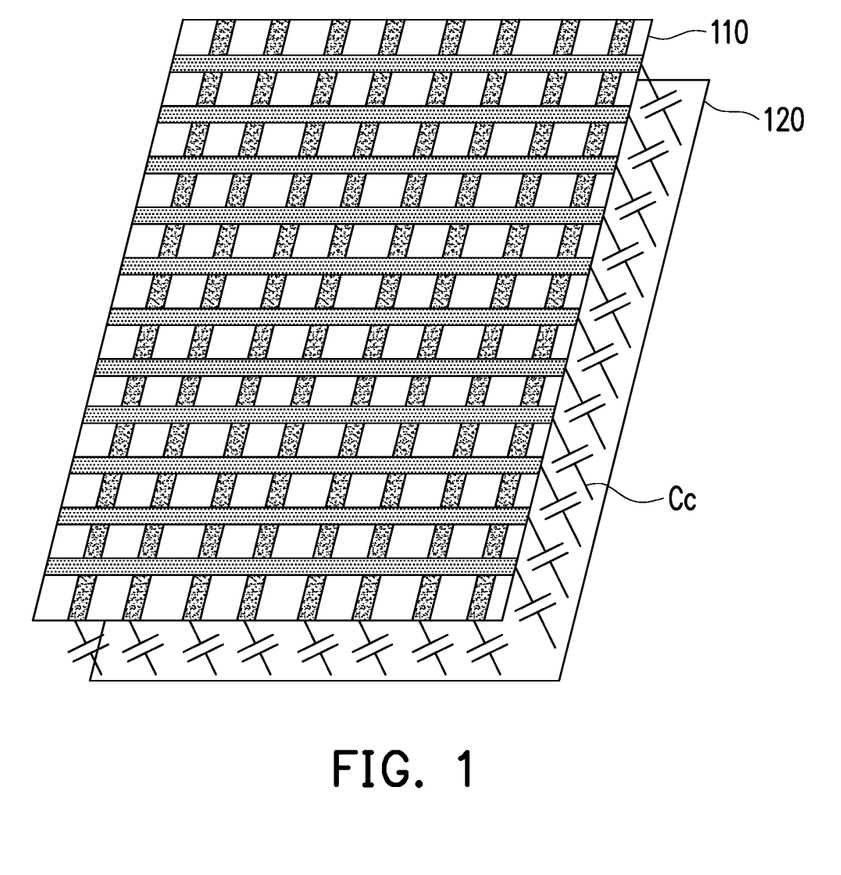
FIG. 1 illustrates a schematic diagram of a structure of a touch display panel.

FIG. 1 illustrates a schematic diagram of a structure of a touch display panel. In the touch display panel, a touch sensing layer 110 overlaps and is on the display panel 120. A parasitic capacitance Cc exists between a common voltage layer and the touch sensing layer 110 of the display panel 120. A voltage adjustment of the display panel 120 becomes a common mode noise CMN of the touch sensing layer 110 through the parasitic capacitance Cc.

Figure 2:
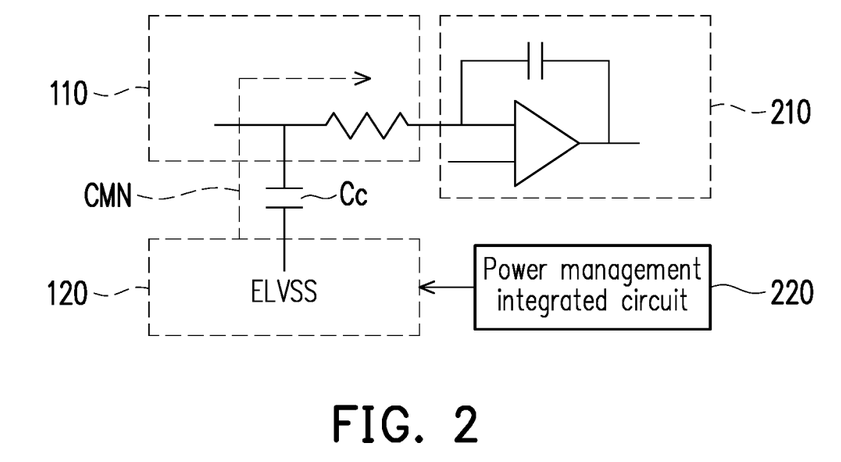
FIG. 2 illustrates a circuit block diagram of a sensing line of a touch sensing layer and an analog front end (AFE) circuit.
Figure 3:
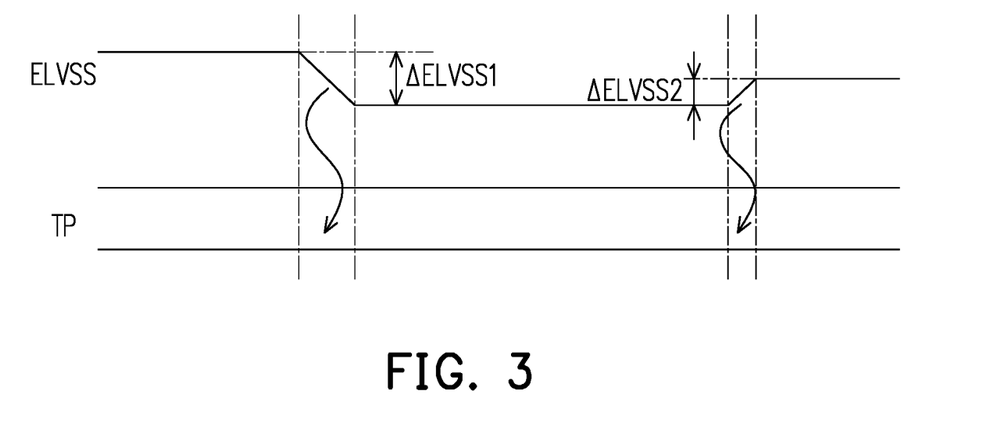
FIG. 3 illustrates a schematic diagram of waveform of the cathode voltage of the OLED.

For example, FIG. 2 illustrates a circuit block diagram of a sensing line of the touch sensing layer 110 and an analog front end (AFE) circuit 210. The AFE circuit 210 may be configured in a touch integrated circuit. In an example in which the display panel 120 is an organic light-emitting diode (OLED) display panel, the common voltage layer of the display panel 120 may be a cathode layer of the OLED. A power management integrated circuit (PMIC) 220 may provide a cathode voltage ELVSS to the cathode of the OLED. FIG. 3 illustrates a schematic diagram of waveform of the cathode voltage ELVSS of the OLED. With reference to FIGS. 2 and 3, during a driving operation of the OLED display panel (the display panel 120), the cathode voltage ELVSS is dynamically changed with different display images. For example, a level of the cathode voltage ELVSS is pulled down by a level difference of $\Delta$ELVSS1, and then pulled up by a level difference of $\Delta$ELVSS2 after a period of time. The dynamic change of the cathode voltage ELVSS becomes the common mode noise CMN of the touch sensing layer 110 through the parasitic capacitance Cc. An adjustment of the cathode voltage ELVSS of the OLED often interferes with touch sensing TP of the touch sensing layer 110, thereby causing a misjudgment by the touch integrated circuit.

SUMMARY

This disclosure provides a touch display device and an operation method thereof, so as to prevent misjudgment of touch sensing during a voltage adjustment period of a common voltage.

In an embodiment of the disclosure, the touch display device includes a touch display panel, a power management circuit, a display driving circuit, and a touch circuit. The power management circuit is coupled to the touch display panel, so as to selectively supply a common voltage to the touch display panel. The display driving circuit is suitable for driving the touch display panel to display an image. The display drive circuit notifies the power management circuit to adjust the common voltage during the voltage adjustment period. The touch circuit is suitable for individually performing a touch sensing operation on multiple sensing lines of the touch sensing layer of the touch display panel, so as to generate multiple touch sensing data corresponding to the multiple sensing lines. The touch circuit ignores the multiple touch sensing data corresponding to the voltage adjustment period, or the touch circuit suspends performing the touch sensing operation on the multiple sensing lines of the touch sensing layer during the voltage adjustment period.

In an embodiment of the disclosure, the operation method includes the following steps. A power management circuit selectively supplies a common voltage to a touch display panel. A display driving circuit drives the touch display panel to display an image. The display driving circuit notifies the power management circuit to adjust the common voltage during a voltage adjustment period. A touch circuit individually performs a touch sensing operation on multiple sensing lines of a touch sensing layer of the touch display panel, so as to generate multiple touch sensing data corresponding to the multiple sensing lines. In addition, the touch circuit ignores the multiple touch sensing data corresponding to the voltage adjustment period, or the touch circuit suspends performing the touch sensing operation on the multiple sensing lines of the touch sensing layer during the voltage adjustment period.

Based on the above, the touch circuit according to the embodiments of the disclosure may perform the touch sensing operation on the touch sensing layer, so as to generate the multiple touch sensing data corresponding to the multiple sensing lines. During the voltage adjustment period of adjusting the common voltage of the touch display panel, the touch circuit may ignore the multiple touch sensing data or suspend performing the touch sensing operation on the multiple sensing lines. Therefore, the touch control circuit may avoid the misjudgment of touch sensing during the voltage adjustment period of the common voltage.

To make the aforementioned more comprehensible, several embodiments accompanied with drawings are described in detail as follows.

DESCRIPTION OF THE EMBODIMENTS

The term "coupled to (or connected to)" used in the text of the description of this disclosure (including the scope of the patent application) may refer to any direct or indirect connection means. For example, when it is described in the text that a first device is coupled (or connected) to a second device, it should be interpreted as that the first device may be directly connected to the second device, or the first device may be indirectly connected to the second device through other devices or some kind of connection means. The terms "first" and "second" mentioned in the text of the description of this disclosure (including the scope of the patent application) are used to name the element, or to distinguish between different embodiments or ranges, and are not meant to limit an upper or lower limit of the number of elements, and is not meant to limit an order of the elements. In addition, wherever possible, elements/components/steps with the same reference numerals in the drawings and embodiments represent the same or similar parts. Reference may be made to related descriptions of the elements/components/steps that use the same reference numerals or use the same terms in different embodiments.

Hereinafter, multiple embodiments of the disclosure describe a technology on how to prevent a voltage adjustment of a display panel from interfering with touch sensing. During a driving operation of the display panel, a common voltage of the display panel may be dynamically changed. For example, in the driving operation of an organic light-emitting diode (OLED) display panel, a OLED cathode voltage ELVSS of the OLED display panel is dynamically changed with different display images. The dynamic change of the cathode voltage ELVSS becomes a common mode noise of a sensing line of a touch sensing layer. During the voltage adjustment of the display panel, the common mode noise is coupled to the sensing line of the touch sensing layer through the parasitic capacitance Cc.

In some embodiments, a touch integrated circuit may autonomously detect whether there is common mode noise interference in the sensing line of the touch sensing layer. In other embodiments, a display driving integrated circuit may notify the touch integrated circuit, so that the touch integrated circuit may know that there is an voltage adjustment (for example, the cathode voltage ELVSS dynamically changing as shown in FIGS. 1 to 3) of the display panel. In the embodiments of the disclosure, after knowing that the cathode voltage ELVSS has changed, the touch integrated circuit may ignore (or discard) a touch sensing signal (an analog signal or digital data) during the "voltage adjustment of the display panel", or suspend performing the touch sensing operation on the sensing line of the touch sensing layer during the "voltage adjustment of the display panel". Therefore, the common mode noise generated by the voltage adjustment of the display panel does not affect touch sensing of the touch sensing layer.

Figure 4:
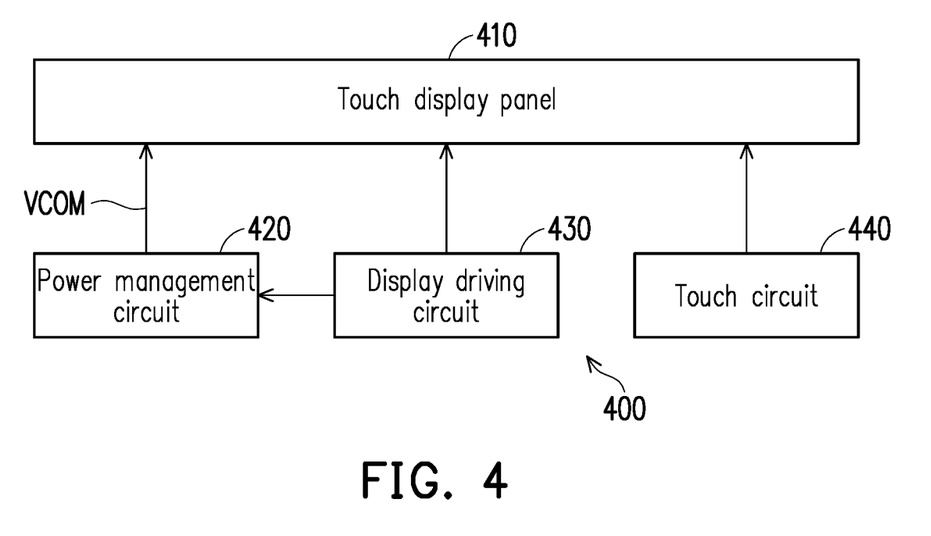
FIG. 4 is a circuit block diagram of a touch display device according to an embodiment of the disclosure.

FIG. 4 is a schematic diagram of a circuit block of a touch display device 400 according to an embodiment of the disclosure. The touch display device 400 shown in FIG. 4 includes a touch display panel 410, a power management circuit 420, a display driving circuit 430, and a touch circuit 440. The power management circuit 420 is coupled to the touch display panel 410, so as to selectively supply a common voltage VCOM to the touch display panel 410. The display driving circuit 430 may drive the touch display panel 410 to display an image, and notify the power management circuit 420 to perform a voltage adjustment of the common voltage VCOM during a voltage adjustment period. The touch circuit 440 may individually perform a touch sensing operation on multiple sensing lines of a touch sensing layer of the touch display panel 410, so as to generate multiple touch sensing data corresponding to the multiple sensing lines. The embodiment does not limit implementation details of the touch display panel 410. In some embodiments, according to actual design, the touch display panel 410 may be deduced by analogy with reference to the related description of the touch sensing layer 110 and the display panel 120 shown in FIGS. 1 and 2. In other embodiments, the touch display panel 410 may be another display panel with weighing and sensing functions.

Figure 5:
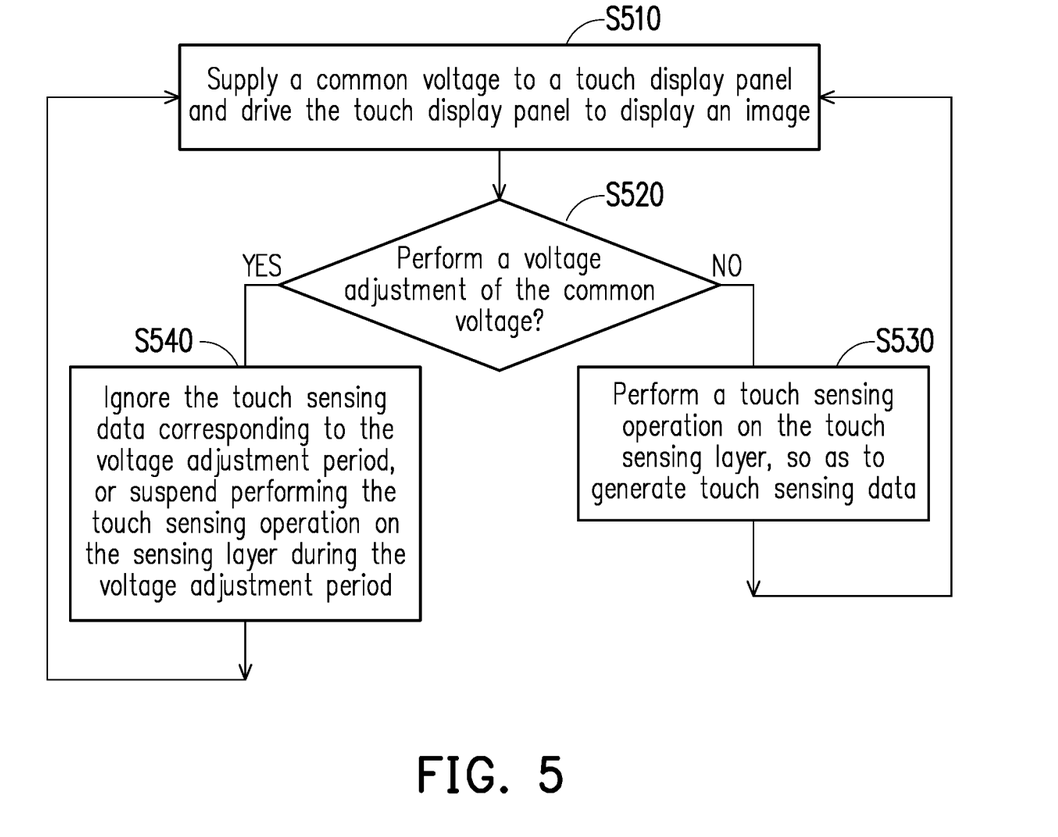
FIG. 5 is a schematic flowchart of an operating method of a touch display device according to an embodiment of the disclosure.

FIG. 5 is a schematic flowchart of an operating method of a touch display device according to an embodiment of the disclosure. With reference to FIGS. 4 and 5, in Step S510, the power management circuit 420 may selectively supply the common voltage VCOM to the touch display panel 410, and the display driving circuit 430 may drive the touch display panel 410 to display an image. As the display screen changes, the display driving circuit 430 may notify the power management circuit 420 to adjust the common voltage VCOM during the voltage adjustment period. The embodiment does not limit implementation details of a display driving operation of the touch display panel 410 by the power management circuit 420 and the display driving circuit 430. In some embodiments, according to actual design, the power management circuit 420 and the display driving circuit 430 may adopt conventional display driving operations. In other embodiments, the power management circuit 420 and the display driving circuit 430 may adopt other display driving operations.

In Step S520, the touch circuit 440 may determine whether the power management circuit 420 has performed the voltage adjustment (that is, whether there is the voltage adjustment period) of the common voltage VCOM. The embodiment does not limit implementation details of "the touch circuit 440 determining the voltage adjustment period". In some embodiments, according to actual design, the touch circuit 440 may autonomously detect whether there is the common mode noise interference in the sensing line of the touch sensing layer, so as to determine "whether there is the voltage adjustment period". In other embodiments, the touch circuit 440 may determine whether there is the voltage adjustment period according to the notification by the display driving integrated circuit 430.

The touch circuit 440 may perform Step S530 when the power management circuit 420 does not perform the voltage adjustment of the common voltage VCOM, that is, there is no voltage adjustment period (determination result of the Step S520 is "No"). In the Step S530, the touch circuit 440 may individually perform the touch sensing operation on the multiple sensing lines of the touch sensing layer of the touch display panel 410, so as to generate the multiple touch sensing data corresponding to the multiple sensing lines.

The touch circuit 440 may perform Step S540 when the power management circuit 420 performs the voltage adjustment of the common voltage VCOM, that is, there is the voltage adjustment period (the determination result of the Step S520 is "Yes"). In the Step S540, the touch circuit 440 may ignore the multiple touch sensing data corresponding to the voltage adjustment period, or the touch circuit 440 may suspend performing the touch sensing operation on the multiple sensing lines of the sensing layer of the touch display panel 410 during the voltage adjustment period.

Based on the above, the touch circuit 440 may perform a touch sensing operation on the touch sensing layer of the touch display panel 410 when the power management circuit 420 does not adjust the common voltage VCOM of the touch display panel 410, so as to generate the multiple touch sensing data corresponding to the multiple sensing lines. During the voltage adjustment period in which the power management circuit 420 adjusts the common voltage VCOM of the touch display panel 410, the touch circuit 440 may suspend performing the touch sensing operation on the multiple sensing lines of the touch display panel 410. Alternatively, the touch circuit 440 may ignore the multiple touch sensing data corresponding to the voltage adjustment period. Therefore, the touch circuit 440 may avoid the misjudgment of touch sensing during the voltage adjustment period of the common voltage VCOM.

Figure 6:
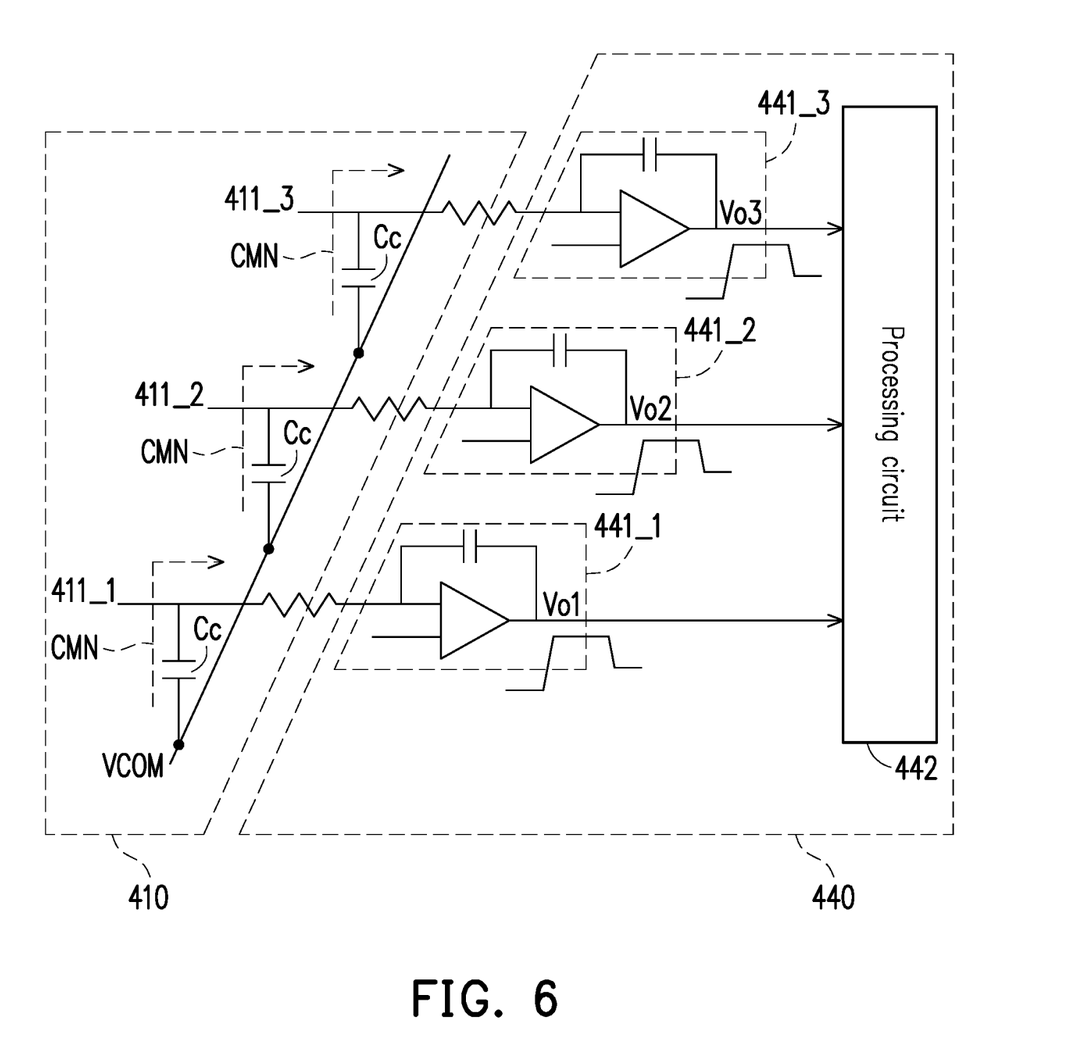
FIG. 6 is a circuit block diagram of the touch circuit shown in FIG. 4 according to an embodiment of the disclosure.

FIG. 6 is a circuit block diagram of the touch circuit 440 shown in FIG. 4 according to an embodiment of the disclosure. According to the actual design, the touch display panel 410 shown in FIG. 6 may be deduced by analogy with reference to the related descriptions of the touch sensing layer 110 and the display panel 120 shown in FIGS. 1 and 2. In the embodiment shown in FIG. 6, the touch control circuit 440 includes multiple of analog front end (AFE) circuits (for example, 441-1, 441-2, and 441-3 shown in FIG. 6) and a processing circuit 442. The AFE circuits 441_1 to 441_3 may sense the multiple sensing lines (for example, 411_1, 411_2, and 411_3 shown in FIG. 6) of the touch sensing layer of the touch display panel 410.

The adjustment of the common voltage VCOM of the touch display panel 410 interferes with/affect the multiple sensing lines 411_1 to 411_3 of the touch sensing layer of the touch display panel 410 through the parasitic capacitance Cc. That is, the adjustment of the common voltage VCOM causes the sensing lines 411_1 to 411_3 to have the same (similar) noise components, such as the common mode noise (CMN). Therefore, output voltages (for example, Vo1, Vo2, and Vo3 shown in FIG. 6) of the AFE circuits 441_1 to 441_3 of the touch circuit 440 have the same (similar) noise characteristics.

In the embodiment shown in FIG. 6, the touch circuit 440 may autonomously detect whether there is the common mode noise interference in the multiple sensing lines 411_1 to 411_3 of the touch sensing layer of the touch display panel 410. The processing circuit 442 is coupled to output terminals of the AFE circuits 441_1 to 441_3. The processing circuit 442 may check and determine whether the output voltages Vo1 to Vo3 of the AFE circuits 441_1 to 441_3 have common noise (the common mode noise CMN), so as to autonomously detect the voltage adjustment period (the period during which the power management circuit 420 performs the adjustment of the common voltage VCOM).

With reference to FIG. 4, in other embodiments, the display driving circuit 430 may notify the touch circuit 440 of the voltage adjustment period (the period during which the power management circuit 420 performs the adjustment of the common voltage VCOM), so that the touch circuit 440 may know that there is the voltage adjustment (for example, the dynamic change of the cathode voltage ELVSS as shown in FIGS. 1 to 3) of the touch display panel 410. According to the notification from the display driving circuit 430, the touch circuit 440 may perform appropriate processing in real time, so as to prevent the adjustment of the common voltage VCOM of the touch display panel 410 from affecting/interfering with the touch sensing of the touch circuit 440.

According to the actual design, the touch circuit 440 may autonomously detect the "voltage adjustment period", and/or the touch circuit 440 may detect the "voltage adjustment period" according to the notification from the display driving circuit 430. The touch circuit 440 may ignore (or discard) the touch sensing signal (the analog signal or the digital data) corresponding to the "voltage adjustment period" after knowing the "voltage adjustment period" during which the common voltage VCOM changes. Alternatively, the touch circuit 440 may suspend the touch sensing operation on the sensing lines of the touch sensing layer of the touch display panel 410 during the "voltage adjustment period".

For example, with reference to FIGS. 4 and 6, the processing circuit 442 may convert the output voltages Vo1 to Vo3 of the AFE circuits 441_1 to 441_3 into multiple touch sensing data. The processing circuit 442 may ignore (or discard) the multiple touch sensing data corresponding to the voltage adjustment period after knowing the "voltage adjustment period" during which the common voltage VCOM changes.

In another example, with reference to FIGS. 4 and 6, the processing circuit 442 may selectively convert the output voltages Vo1 to Vo3 of the AFE circuits 441_1 to 441_3 into the multiple touch sensing data. The processing circuit 442 may ignore (or does not convert) the output voltages Vo1 to Vo3 of the AFE circuits 441_1 to 441_3 in the voltage adjustment period after knowing the "voltage adjustment period" during which the common voltage VCOM changes.

In another example, with reference to FIGS. 4 and 6, the processing circuit 442 may selectively convert the output voltages Vo1 to Vo3 of the AFE circuits 441_1 to 441_3 into the multiple touch sensing data. The processing circuit 442 may disable the AFE circuits 441_1 to 441_3 during the voltage adjustment period, so as to suspend the touch sensing operation on the sensing lines 411_1 to 411_3 of the touch sensing layer of the touch display panel 410 after knowing the "voltage adjustment period" during which the common voltage VCOM changes.

In summary, the processing circuit 442 may perform the touch sensing operation on the touch sensing layer of the touch display panel 410 when the power management circuit 420 does not perform the adjustment of the common voltage VCOM of the touch display panel 410, so as to generate the multiple touch sensing data corresponding to the sensing lines 411_1 to 411_3. During the period (the voltage adjustment period) in which the power management circuit 420 performs the adjustment of the common voltage VCOM of the touch display panel 410, the AFE circuits 441_1 to 441_3 may suspend the touch sensing operation on the sensing lines 411_1 to 411_3 of the touch display panel 410. Alternatively, the processing circuit 442 may ignore (or does not convert) the output voltages Vo1 to Vo3 of the AFE circuits 441_1 to 441_3 during the voltage adjustment period. Alternatively, the processing circuit 442 may ignore (or discard) the touch sensing data corresponding to the voltage adjustment period. Therefore, the touch circuit 440 may prevent the misjudgment of touch sensing during the period (the voltage adjustment period) in which the adjustment of the common voltage VCOM is performed.

Implementations of the blocks of the touch circuit 440 and/or the processing circuit 442 may be hardware, firmware, software, or a combination thereof, according to different design requirements.

In terms of hardware, the blocks of the touch circuit 440 and/or the processing circuit 442 may be implemented as a logic circuit on an integrated circuit. Relevant functions of the touch circuit 440 and/or the processing circuit 442 may be implemented as hardware using hardware description languages (for example, Verilog HDL or VHDL) or other suitable programming languages. For example, the relevant functions of the touch circuit 440 and/or the processing circuit 442 may be implemented as one or more controllers, a microcontroller, a microprocessor, an application-specific integrated circuit (ASIC), a digital signal processor (DSP), a field programmable gate array (FPGA), and/or various logic blocks, modules and circuits in other processing units.

In terms of software and/or firmware, the relevant functions of the touch circuit 440 and/or the processing circuit 442 may be implemented as programming codes. For example, general programming languages (such as C, C++, or a combination of languages), or other suitable programming languages are used to implement the touch circuit 440 and/or the processing circuit 442. The programming codes may be recorded/stored in a non-transitory computer readable medium. In some embodiments, the non-transitory computer readable medium includes, for example, a read-only memory (ROM) and/or a storage device. The storage device includes a hard disk drive (HDD), a solid-state drive (SSD), or other storage devices. A central processing unit (CPU), a controller, a microcontroller, or a microprocessor may read and execute the programming codes from the recording medium, thereby implementing the relevant functions of the touch circuit 440 and/or the processing circuit 442.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A touch display device comprising:
    a touch display panel;
    a power management circuit, coupled to the touch display panel to selectively supply a common voltage to the touch display panel;
    a display driving circuit, suitable for driving the touch display panel to display an image, and notifying the power management circuit to perform a voltage adjustment of the common voltage during a voltage adjustment period; and
    a touch circuit, suitable for individually performing a touch sensing operation on a plurality of sensing lines of a touch sensing layer of the touch display panel, so as to generate a plurality of touch sensing data corresponding to the plurality of sensing lines,
    wherein the touch circuit ignores the plurality of touch sensing data corresponding to the voltage adjustment period, or the touch circuit suspends performing the touch sensing operation on the plurality of sensing lines of the touch sensing layer during the voltage adjustment period.

2. The touch display device according to claim 1, wherein the touch circuit comprises:
    a plurality of analog front-end circuits, suitable for sensing the plurality of sensing lines of the touch sensing layer; and
    a processing circuit, coupled to output terminals of the plurality of analog front-end circuits, and configured to check and determine whether a plurality of output voltages of the plurality of analog front-end circuits have a common noise, so as to autonomously detect the voltage adjustment period.

3. The touch display device according to claim 1, wherein the display driving circuit notifies the touch circuit of the voltage adjustment period.

4. The touch display device according to claim 1, wherein the touch circuit comprises:
    a plurality of analog front-end circuits, suitable for sensing the plurality of sensing lines of the touch sensing layer; and
    a processing circuit, coupled to output terminals of the plurality of analog front-end circuits, and configured to convert a plurality of output voltages of the plurality of analog front-end circuits into the plurality of touch sensing data,
    wherein the processing circuit ignores or discards the plurality of touch sensing data corresponding to the voltage adjustment period.

5. The touch display device according to claim 1, wherein the touch circuit comprises:
    a plurality of analog front-end circuits, suitable for sensing the plurality of sensing lines of the touch sensing layer; and
    a processing circuit, coupled to output terminals of the plurality of analog front-end circuits, and configured to convert a plurality of output voltages of the plurality of analog front-end circuits into the plurality of touch sensing data,
    wherein the processing circuit ignores or does not convert the plurality of output voltages of the plurality of analog front-end circuits during the voltage adjustment period.

6. The touch display device according to claim 1, wherein the touch circuit comprises:
    a plurality of analog front-end circuits, suitable for sensing the plurality of sensing lines of the touch sensing layer; and
    a processing circuit, coupled to output terminals of the plurality of analog front-end circuits, and configured to convert a plurality of output voltages of the plurality of analog front-end circuits into the plurality of touch sensing data,
    wherein the processing circuit disables the plurality of analog front-end circuits during the voltage adjustment period.

7. An operation method of a touch display device, comprising:
    selectively supplying a common voltage to a touch display panel by a power management circuit;
    driving the touch display panel to display an image by a display driving circuit;
    notifying the power management circuit to perform a voltage adjustment of the common voltage during a voltage adjustment period by the display driving circuit;
    individually performing a touch sensing operation on a plurality of sensing lines of a touch sensing layer of the touch display panel by a touch circuit, so as to generate a plurality of touch sensing data corresponding to the plurality of sensing lines; and
    ignoring the plurality of touch sensing data corresponding to the voltage adjustment period by the touch circuit, or suspending performing the touch sensing operation on the plurality of sensing lines of the touch sensing layer during the voltage adjustment period by the touch circuit.

8. The operation method according to claim 7, further comprising:
    sensing the plurality of sensing lines of the touch sensing layer by a plurality of analog front-end circuits of the touch circuit; and
    checking and determining whether a plurality of output voltages of the plurality of analog front-end circuits have a common noise by a processing circuit of the touch circuit, so as to autonomously detect the voltage adjustment period.

9. The operation method according to claim 7, further comprising:
notifying the touch circuit of the voltage adjustment period by the display driving circuit.

10. The operation method according to claim 7, wherein the operation of ignoring the plurality of touch sensing data corresponding to the voltage adjustment period comprises:
sensing the plurality of sensing lines of the touch sensing layer by a plurality of analog front-end circuits of the touch circuit;
converting a plurality of output voltages of the plurality of analog front-end circuits into the plurality of touch sensing data by a processing circuit of the touch circuit; and
ignoring or discarding the plurality of touch sensing data corresponding to the voltage adjustment period by the processing circuit.

11. The operation method according to claim 7, wherein the operation of suspending performing the touch sensing operation comprises:
sensing the plurality of sensing lines of the touch sensing layer by a plurality of analog front-end circuits of the touch circuit;
converting a plurality of output voltages of the plurality of analog front-end circuits not during the voltage adjustment period into the plurality of touch sensing data by a processing circuit of the touch circuit; and
ignoring or not converting the plurality of output voltages of the plurality of analog front-end circuits in the voltage adjustment period by the processing circuit.

12. The operation method according to claim 7, wherein the operation of suspending performing the touch sensing operation comprises:
sensing the plurality of sensing lines of the touch sensing layer by a plurality of analog front-end circuits of the touch circuit;
converting a plurality of output voltages of the plurality of analog front-end circuits not during the voltage adjustment period into the plurality of touch sensing data by a processing circuit of the touch circuit; and
disabling the plurality of analog front-end circuits during the voltage adjustment period by the processing circuit.

\* \* \* \* \*